(12) United States Patent
Des Jardins et al.

(10) Patent No.: US 8,401,901 B2
(45) Date of Patent: *Mar. 19, 2013

(54) ADVERTISING CONTENT DELIVERY

(75) Inventors: G. Thomas Des Jardins, Alexandria, VA (US); Jeffrey Dalton Porter, Flower Mound, TX (US); David Markley, Gainesville, VA (US); Bryan Slavin, Rockville, MD (US)

(73) Assignee: Facebook, Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/355,418

(22) Filed: Jan. 20, 2012

(65) Prior Publication Data

US 2012/0191548 A1  Jul. 26, 2012

Related U.S. Application Data

(63) Continuation of application No. 11/023,638, filed on Dec. 29, 2004, now Pat. No. 8,103,546.

(60) Provisional application No. 60/601,655, filed on Aug. 16, 2004.

(51) Int. Cl.
*G06Q 30/02* (2012.01)
*G06Q 30/00* (2012.01)
*H04N 7/10* (2006.01)
*G11C 7/00* (2006.01)

(52) U.S. Cl. ............... 705/14.68; 705/14.73; 705/14.52; 725/35; 725/116; 365/200

(58) Field of Classification Search ................. 705/14.68
See application file for complete search history.

(56) References Cited

U.S. PATENT DOCUMENTS

| | | |
|---|---|---|
| 6,029,045 A | 2/2000 | Picco et al. |
| 6,061,691 A | 5/2000 | Fox |
| 6,198,906 B1 | 3/2001 | Boetje et al. |
| 6,247,946 B1 | 6/2001 | Nakamura et al. |
| 6,248,946 B1 | 6/2001 | Dwek |
| 6,338,043 B1 | 1/2002 | Miller |
| 6,426,778 B1 | 7/2002 | Valdez |
| 6,463,585 B1 * | 10/2002 | Hendricks et al. ............ 725/35 |
| 6,552,254 B2 | 4/2003 | Hasegawa et al. |
| 6,760,916 B2 | 7/2004 | Holtz et al. |
| 6,772,200 B1 | 8/2004 | Bakshi et al. |
| 6,820,277 B1 | 11/2004 | Eldering et al. |
| 7,171,402 B1 | 1/2007 | Chatani |
| 7,174,305 B2 * | 2/2007 | Carruthers et al. ........ 705/14.52 |
| 7,401,097 B1 | 7/2008 | Baer et al. |
| 7,886,067 B2 | 2/2011 | Krassner et al. |
| 2002/0023274 A1 | 2/2002 | Giacalone |
| 2002/0083435 A1 | 6/2002 | Blasko et al. |

(Continued)

OTHER PUBLICATIONS

U.S. Appl. No. 11/088,263, filed Mar. 24, 2005, entitled "Managing Advertising Inventory" (69 pages).

(Continued)

*Primary Examiner* — John Weiss
*Assistant Examiner* — Marilyn G Macasiano
(74) *Attorney, Agent, or Firm* — Keller Jolley & Preece

(57) ABSTRACT

Programming media and advertising media may be presented in a manner that approximates or equals a target ratio. In one implementation, a total temporal length of one or more programming media segments is accessed after the user has selected the programming media segments. One or more advertising media segments are then selected. The advertising media segments have a total length that is based on the total temporal length of the programming media segments and a target temporal ratio between programming media and advertising media. The client system may present the one or more selected advertising media segments.

20 Claims, 12 Drawing Sheets

U.S. PATENT DOCUMENTS

| | | |
|---|---|---|
| 2002/0178054 A1 | 11/2002 | Ader |
| 2002/0184047 A1 | 12/2002 | Plotnick et al. |
| 2003/0046139 A1 | 3/2003 | Beman et al. |
| 2003/0056222 A1 | 3/2003 | Iwata et al. |
| 2003/0058707 A1* | 3/2003 | Dilger et al. .................. 365/200 |
| 2003/0101454 A1 | 5/2003 | Ozer et al. |
| 2003/0110171 A1 | 6/2003 | Ozer et al. |
| 2003/0120541 A1 | 6/2003 | Siann et al. |
| 2003/0139966 A1 | 7/2003 | Sirota et al. |
| 2003/0225629 A1 | 12/2003 | Banks et al. |
| 2004/0024641 A1 | 2/2004 | Cartwright |
| 2004/0025174 A1 | 2/2004 | Cerrato |
| 2004/0093327 A1 | 5/2004 | Anderson et al. |
| 2004/0225562 A1 | 11/2004 | Turner |
| 2005/0038666 A1 | 2/2005 | Theiste et al. |
| 2005/0038667 A1 | 2/2005 | Hileman et al. |
| 2005/0097593 A1 | 5/2005 | Raley et al. |
| 2005/0154746 A1 | 7/2005 | Liu et al. |
| 2005/0229209 A1 | 10/2005 | Hildebolt et al. |
| 2006/0080171 A1 | 4/2006 | Jardins et al. |

OTHER PUBLICATIONS

U.S. Appl. No. 11/343,873, filed Jan. 30, 2006, entitled "Controlling User Experience" (48 pages).

U.S. Appl. No. 11/023,631, filed Jan. 29, 2004, entitled "Auditing of Content Related Events" (37 pages).

\* cited by examiner

ADVERTISING CONTENT DELIVERY

CLAIM OF PRIORITY

This application is a continuation of U.S. application Ser. No. 11/023,638, filed Dec. 29, 2004, now U.S. Pat. No. 8,103,546, which claims priority to U.S. Provisional Application No. 60/601,655, filed on Aug. 16, 2004, each of which are expressly incorporated herein by reference to their entireties.

TECHNICAL FIELD

This description relates to providing advertising content.

BACKGROUND

Dynamic content, such as audio and/or visual content, may be delivered and presented to users across packet-based networks, such as the Internet. Providers of this content also may desire to couple advertising with the dynamic content. Static advertising such as banner advertising on the Internet has been provided. Dynamic advertising also may be provided.

SUMMARY

One metric for characterizing the amount of dynamic advertising a user receives is a ratio of time a user receives dynamic advertising to the time the user receives programming media content. The described techniques may allow for a target ratio to be maintained as a user self-selects programming media content. For example, to maintain a particular ratio, advertising media content might only be associated with every third piece of programming media content, assuming a fixed and common length for all programming and advertising media content, and assuming all programming and advertising media content is presented to the user in its entirety. In less constrained situations, it may be difficult to define in advance the length of advertising media content that should be associated with particular pieces of programming media content in order to maintain a particular ratio between the programming media content and the advertising media content that a user is presented. This is because the different pieces of programming media content available to the user may be of different lengths, and because the user is self-selecting such segments, the total length of programming media content that the user will select is not known beforehand. However, providers of the content may desire the ability to define the ratio because, when a significant portion of the content presented to a user is advertising media content, the user may decide to stop viewing content from that provider, thereby decreasing advertising and/or other revenues.

Accordingly, in one aspect, a user may select one or more programming media segments for presentation by a client system. A total programming temporal length of the programming media segments is accessed after the user has selected the programming media segments. Advertising media segments are selected and have a total advertising temporal length. The total advertising temporal length is based on the total programming temporal length and a target temporal ratio between programming media and advertising media. The client system is enabled to present the selected advertising media segments.

Implementations may include one or more of the following features. For example, the total advertising temporal length may be determined based on the total programming temporal length and the target temporal ratio and may be determined such that a ratio between the total advertising temporal length and the total programming temporal length is substantially equal to the target temporal ratio.

Accessing the total programming temporal length may include receiving state information from the client system; and tracking temporal lengths of the programming media segments based on the state information. Accessing the total programming temporal length may include determining the total programming temporal length.

The target temporal ratio may be accessed based on, e.g., a location from which the one or more programming media segments was selected by the user, an identification of the one or more programming media segments selected by the user, an owner of the one or more programming media segments selected by the user, a category of the one or more programming media segments, time of day, and/or which template was accessed previously for the user.

A template may be accessed to access the target temporal ration. The template may be accessed based on a combination of a category of the programming media segments and a location from which the programming media segments was selected by the user. The template may be accessed based on a combination of an owner of the programming media segments and a location from which the programming media segments was selected by the user. The location from which the programming media segments was selected may include a location in a hierarchically arranged website.

Information may be received from the client system regarding a temporal length of a programming media segment the client system has presented within a past time frame or a temporal length of a programming media segment that will be presented by the client system.

The advertising media segments may be selected from advertising media segments that satisfy a set of business rules regarding at least one advertising campaign.

The client system may be provided with information that allows the client system to retrieve and present the advertising media segments. The information may include location information for the one or more selected advertising media segments. The one or more selected advertising media segments may be retrieved and transmitted to the client system.

The client system may present the advertising media segments and the programming media segments in a sequential manner. The user may explicitly or implicitly select the programming media segments The selected advertising media segments may be previews, teasers, branding, or advertisements.

In another aspect, programming audio-visual content and advertising audio-visual content is provided in accordance with a target temporal ratio. An indication of one or more programming audio-visual segments selected from a website by a user for presentation on a client system is received and a total programming temporal length of the programming audio-visual segments is accessed. A target temporal ratio between programming media and advertising media is accessed and a total advertising temporal length is determined based on the total programming temporal length and the target temporal ratio. One or more advertising audio-visual segments are selected. The advertising audio-visual segments have, either alone or in combination with advertising audio-visual segments previously presented by the client system, the total advertising temporal length. The client system is enabled to present the advertising media segments such that the client system presents the selected advertising media segments and the programming media segments in a sequential manner.

Implementations of the described techniques may include hardware, a method or process, and computer software on a computer-accessible medium.

The details of one or more implementations are set forth in the accompanying drawings and the description below. Other features will be apparent from the description and drawings, and from the claims.

DETAILED DESCRIPTION

Figure 1:
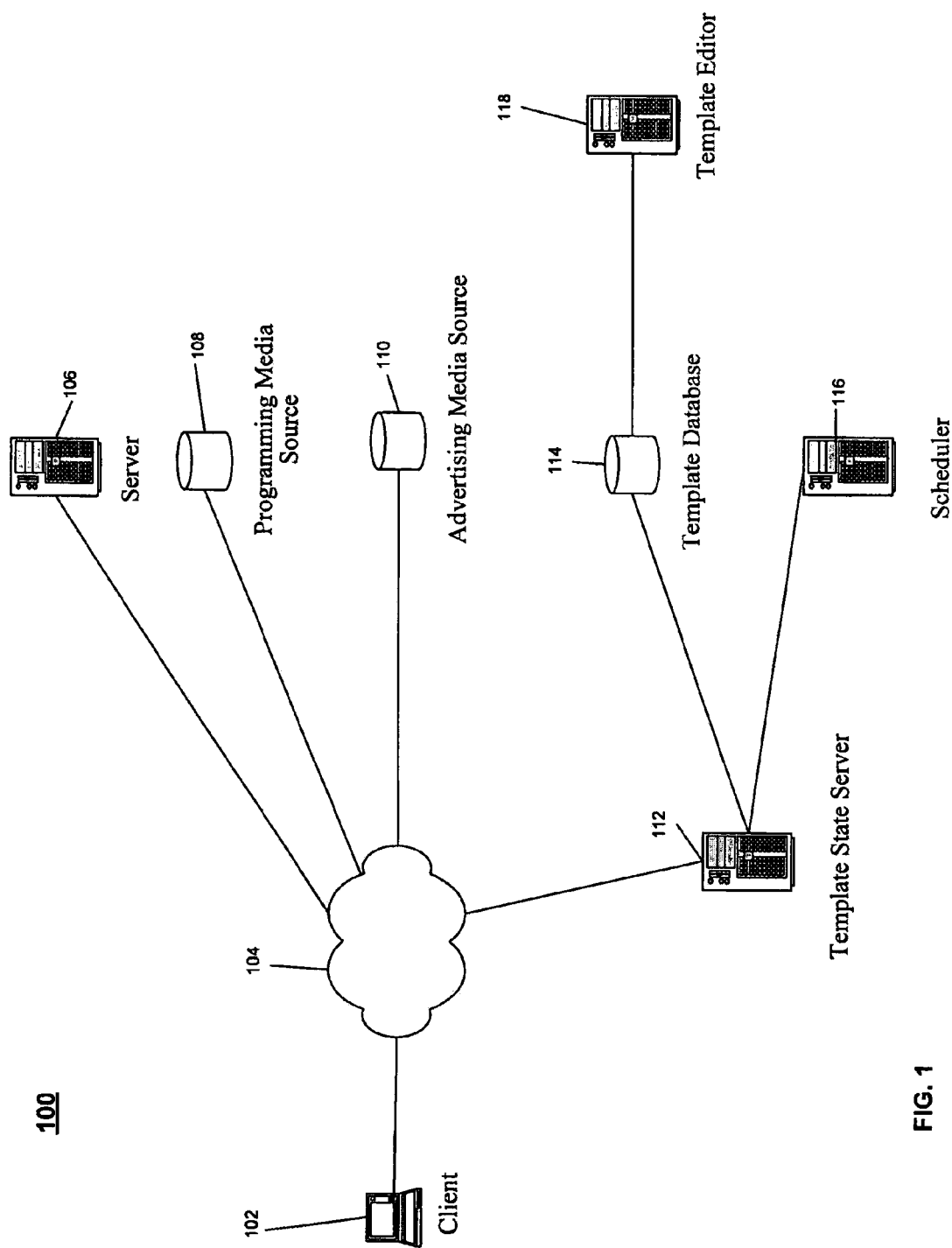
FIG. 1 is a block diagram of a system that presents programming media and advertising media on a client system with a ratio approximating or equaling a target temporal ratio.

Referring to FIG. 1, a system 100 presents programming media and advertising media on a client system 102, with a ratio between the programming media and the advertising media approximating or equaling a target temporal ratio. System 100 includes a client system 102 that can communicate with a server computer 106 over a packet-switched network 104, such as the Internet. System 100 also includes a template state server 112, a template database 114, a scheduler 116, a template editor 118, a programming media source 108 and an advertising media source 110.

Each of the components of system 100 (for example, client system 102, server 106, template state server 112, a template database 114, a scheduler 116, a template editor 118, a programming media source 108 and an advertising media source 110) may be implemented using, for example, a general-purpose computer capable of responding to and executing instructions in a defined manner, a personal computer, a special-purpose computer, a workstation, a server, a device, a component, or other equipment or some combination thereof capable of responding to and executing instructions. These components may receive instructions from, for example, a software application, a program, a piece of code, a device, a computer, a computer system, or a combination thereof, which independently or collectively direct operations, as described herein. The instructions may be embodied permanently or temporarily in any type of machine, component, equipment, storage medium, or propagated signal.

Packet switched network 104 may include Wide Area Networks (WANs), Local Area Networks (LANs), analog or digital wired and wireless telephone networks (for example, a Public Switched Telephone Network (PSTN), an Integrated Services Digital Network (ISDN), or a Digital Subscriber Line (xDSL)), or any other wired or wireless network including, for example, a corporate LAN. Network 104 may include multiple networks or subnetworks, each of which may include, for example, a wired or wireless data pathway.

In addition, while illustrated as separate components, any combination of client system 102, template state server 112, template database 114, scheduler 116, template editor 118, media sources 108 and 110, and/or web server 106 may be implemented on a single computing device or cluster of computing devices.

In general, client system 102 communicates with server 106 to obtain a media page, from which a user can select programming media for presentation by client system 102. The client system 102 receives the selected programming media from programming media source 108 and present it to the user. Client system 102 also may present advertising media from advertising media source 110.

Client system 102 communicates with template state server 112 to determine specific advertising media to present from advertising media source 110. Template state server 112 determines or accesses a target ratio between advertising media and programming media by, for example, accessing a template (which may be created by template editor 118) stored in template database 118. Template state server 112 also determines or accesses the temporal length of programming media that has been or will be presented by the client system 102 based, for example, on communications from client system 102. Using this information, template state server 112 determines the temporal length of advertising media that results in the ratio between programming media and advertising media presented by client system 102 to approximate or equal the target ratio.

Template state server 112 communicates the determined temporal length to scheduler 116. Scheduler 116 then selects a specific piece of advertising media that has the determined temporal length and identifies the specific piece of advertising media to template state server 112. Template state server 112 then causes client system 102 to present the specific piece of advertising media.

Client system 102 may execute a hypertext transfer protocol (HTTP) based web browser that presents media pages, such as hypertext markup language (HTML) or other markup language web pages. A media client application may be embedded in one or more of the web pages presented by the web browser. The media client application presents dynamic content, such as audio content or video content, to a user through, for example, visual, auditory, or tactile presentation devices. The media client application also may implement the HTTP protocol to request the dynamic content.

Alternatively, the media client application may be a stand-alone application that presents both static content, such as the static portion of web pages, and the dynamic content such as audio or video content. Stand-alone media client application also may implement HTTP to request the static content and/or the dynamic content. Examples of a media client application include Windows Media Player from Microsoft Corp. of Redmond, Wash. and RealPlayer from RealNetworks of Seattle, Wash., both of which can be stand-alone or embedded into a web page.

Server computer 106 may execute HTTP server software to respond to data requests from an HTTP-based web browser and/or an HTTP-based media client application executing at client system 102. In response to a data request from the web browser or media client application, server computer 106 provides a media page, for example a web page, for presentation by the web browser or media client application.

The web page presents one or more selections of programming media, that is, for example, dynamic content such as audio and/or video content, for presentation by the media client application and includes information (for example, a uniform resource locator (a URL)) that allows the media client application to form a request for the audio and/or video content. The audio and/or video content may be in the form of continuous or on-demand media streams.

The web page may be part of a website that includes a number of web pages that present selections of audio and/or video content for presentation by the media client application. The website may be arranged in a hierarchical fashion, as shown and described below in FIG. 2, such that the different web pages are organized into topical or themed sections, with lower levels further dividing the sections.

Figure 2:
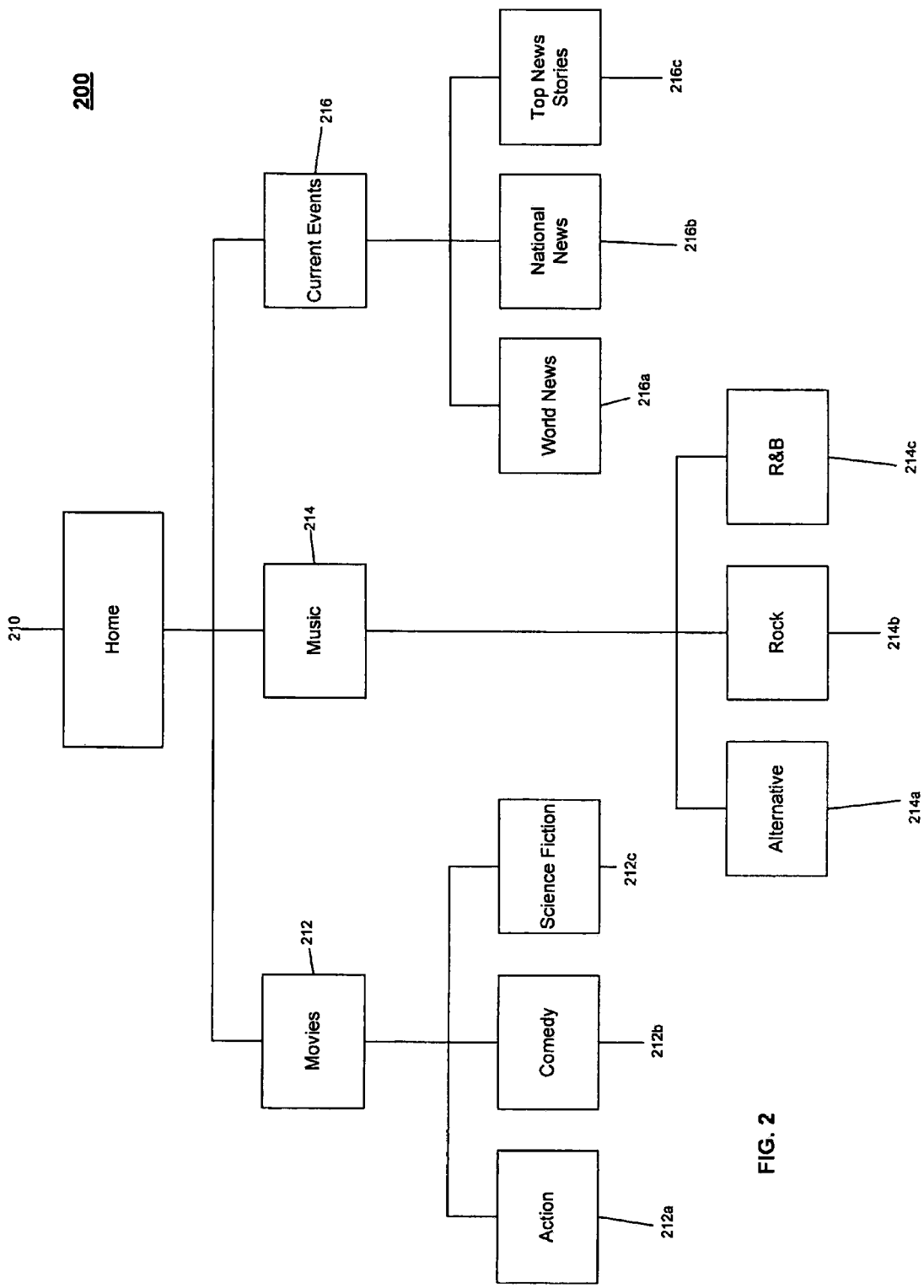
FIG. 2 shows an example of a website hierarchy.

FIG. 2 shows an example of a hierarchy 200 of a website that may be provided by server 106. At the top of the website hierarchy is the home page 210. Home page 210 contains links to web pages directed to different topics or themes of the website. For example, home page 210 includes links to a web page 212 directed to movies, a web page 214 directed to music, and a web page 216 directed to current events. Each of these web pages further includes links to web pages directed to sub-topics or sub-themes of the topic or the theme associated with the higher level web page. For instance, the movies web page 212 contains links to a web page 212a directed to action movies, a web page 212b directed to comedies, and a web page 212c directed to science fiction movies. The music web page 214 includes links directed to a web page 214a directed to alternative music, a web page 214b directed to rock music, and a web page 214c directed to R&B music. Likewise, the current events web page 216 includes links to a web page 216a directed to world news, a web page 216b directed to national news, and a web page 216c directed to top news stories.

Each of the web pages may include audio and/or video content selections. The selections in any given page are related to the topic/sub-topic to which the web page is directed. For instance, home web page 210 may include selections for audio and/or video content related to any of the topics of the website, e.g., movies, music, or news. The movies web page 212 then may include audio and/or video selections related to movies across any genre/category, while the action movies web page 212a includes selections of audio and/or video content related only to action movies. The web pages of higher level topics may include only a few selections of audio and/or video content related to each of the sub-topics, while the lower level web pages may present selections for all of the audio and/or video content available for that sub-topic.

Other hierarchical organizations are possible. For example, a news station may have a website whose hierarchy breaks down into news related topics, such as headline news, local news, world news, sports, talk shows, etc. Furthermore, a website may be maintained for a number of media outlets and may have a hierarchical organization that breaks down into the various media outlets, and then further breaks down into various topics offered by those media outlets. In addition, a provider of online content may have its own "channels" of specialized content, and these channels may be included in the hierarchy. For instance, America Online offers a "channel" to subscribers referred to as "AOL Sessions," which provides unique performances by various artists.

Figure 3A:
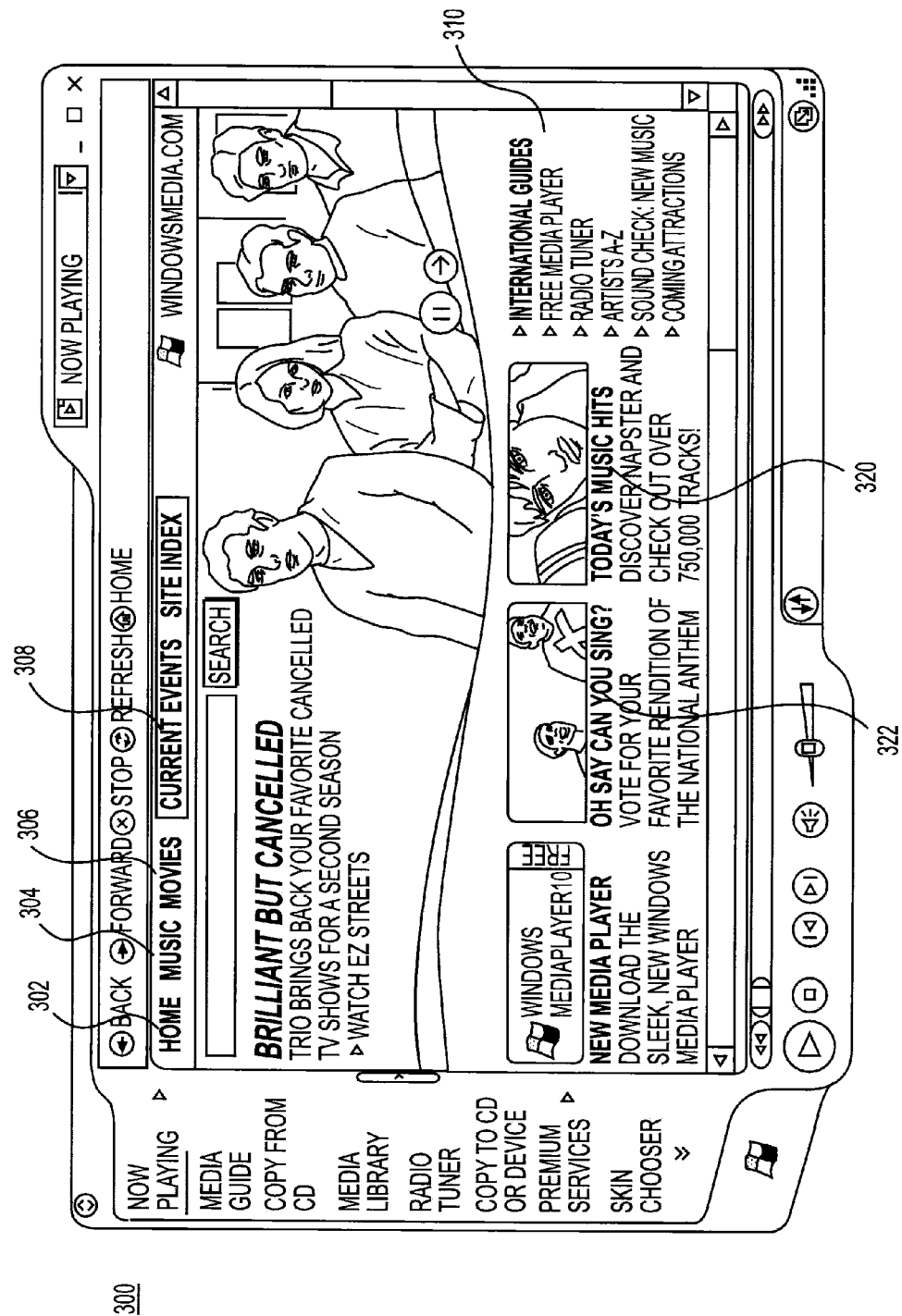
FIGS. 3A-3C show an example of a stand-alone media client application displaying media pages.
Figure 3B:
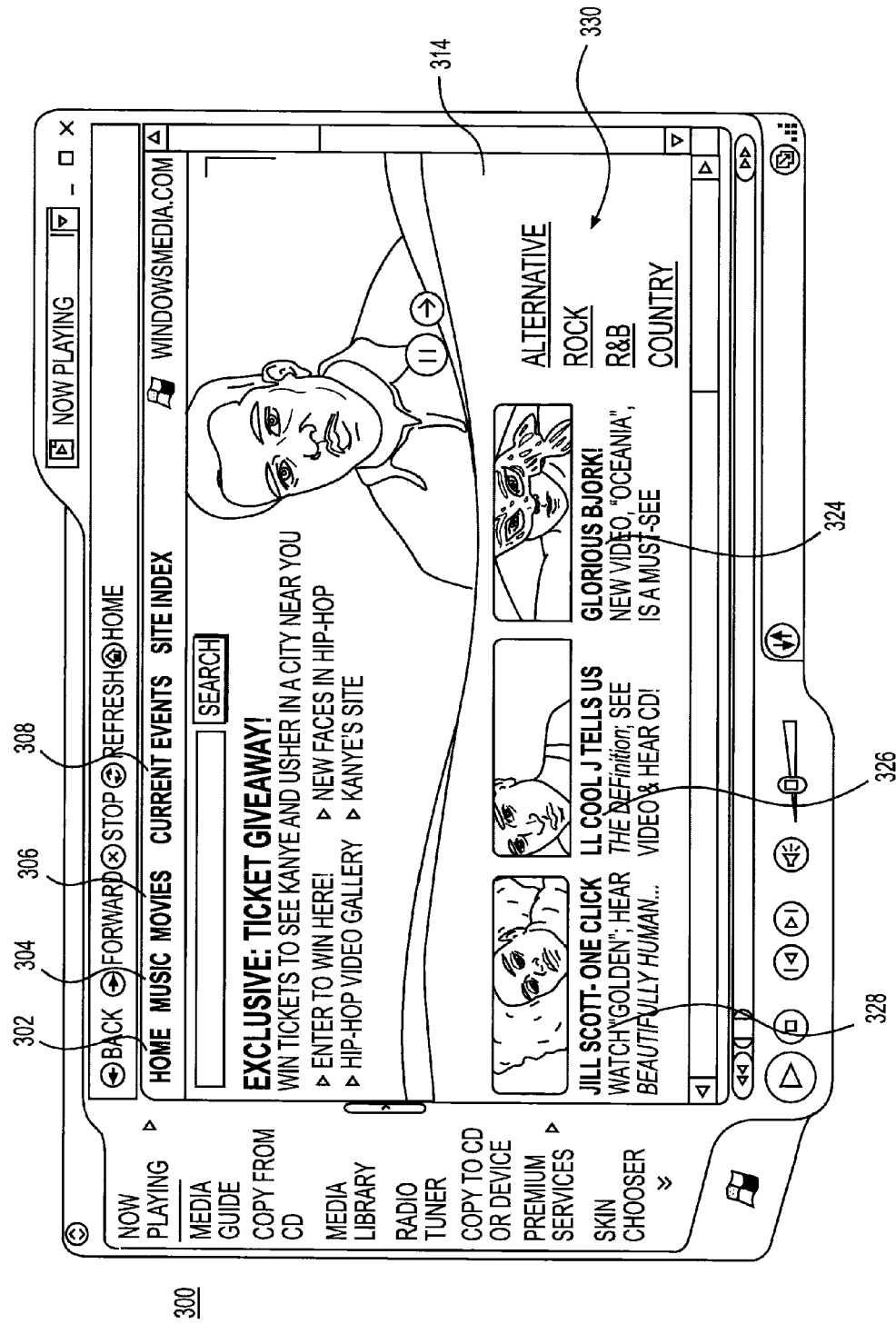
Figure 3C:
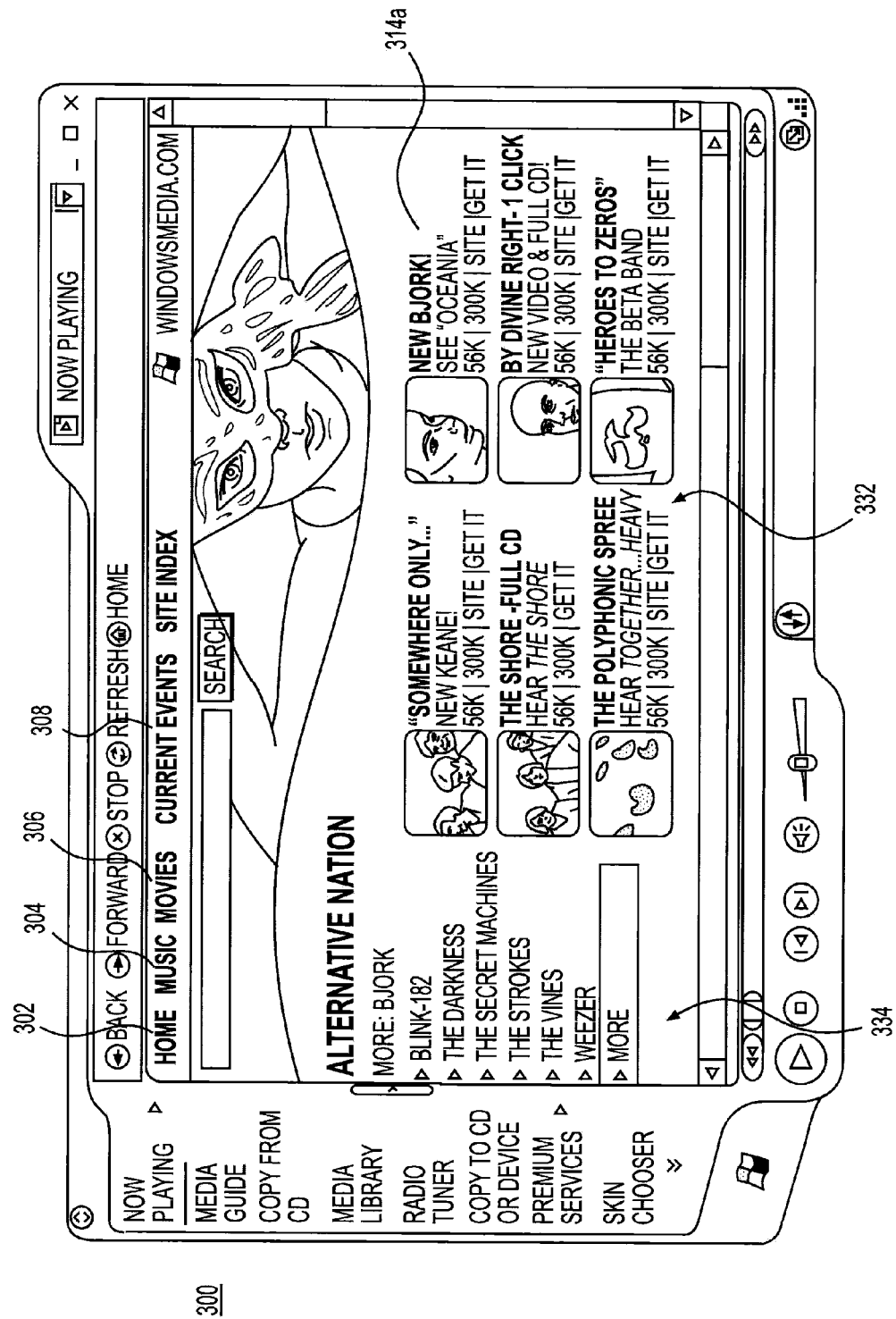

FIGS. 3A-3C show an example of a stand-alone media client application 300 displaying media pages, such as web pages, corresponding to a hierarchical site such as the one described with respect to FIG. 2. Referring to FIG. 3A, media client application 300 presents a home web page 310 that includes links 302-308 that correspond to different topics or themes covered by the website and which link to a corresponding web page for each topic. Link 302 links to home page 310. Link 304 links to music web page 314 (shown in FIG. 3B below), link 306 links to movies web page, and link 308 links to a current events web page. When a user selects one of the links 302-308, the web page corresponding to the topic or theme is presented by media client application 300. Home web page 310 also includes links 320 and 322 that link to web pages in different sub-topical or sub-theme areas of the website. Link 320 points to a web page for "today's music hits" (not shown) located, hierarchically, underneath the music web page. Link 322 points to a web page located, hierarchically, underneath current events web page. While not shown, home web page 310 may contain some selections for audio and/or video content related to one or more of the topics/themes or sub-topics/sub-themes covered by the website.

Referring to FIG. 3B, when a user selects music link 304 in home web page 310, a music web page 314 is displayed. Music web page 314 includes links 324-328 that provide selections for audio and/or video content related to some sub-topics/sub-themes of music. When a user selects one of links 324-328, the corresponding audio and/or video is presented to the user by media client application 300. Music web page 314 also includes links 330 that link to sub-topic or sub-theme web pages under the music topic/theme in the website.

Referring to FIG. 3C, when a user selects the "Alternative" link from links 330, an alternative music web page 314a is displayed. Alternative music web page 314a contains selections 332 of audio and/or video content for the sub-topic/sub-theme "alternative music." Similar to links 324-328, when a user selects one of links 332, the corresponding audio and/or video is presented to the user by media client application 300. Alternative music web page 314a also includes links 334 to sub-topics/sub-themes underneath the alternative music topic or category. The particular sub-topics/sub-themes shown correspond to bands (Blink-182, The Darkness, The Secret Machines, The Strokes, The Vines, and Weezer are shown) whose music fits within the topic/theme "alternative music."

Referring again to FIG. 1, the media client application receives programming media for presentation from programming media source 108. Programming media is the editorial content that the user desires to have presented and is generally represented by the selections in the web page (such as selections 332 in FIG. 3C above). Programming media source 108 may execute HTTP server software to respond to requests for programming media from an HTTP-based media client application. In response to such requests, programming media source 108 provides the requested programming media to the media client application for presentation. A request for programming media may be initiated by the media client application when a user selects one of the selections of programming media content provided by a web page, such as one of the links 334 shown in FIG. 3C.

The media client application receives advertising media for presentation from advertising media source 110. Advertising media is generally any other media besides the editorial content and is typically media that promotes particular services or goods. Advertising media may be, for example, previews for programming media other than the selected media being offered in the future (that is, previews), previews for the selected programming media (that is, teasers), an indication of the source of programming media (that is, branding), or promotions to buy or otherwise acquire specific products or services (that is, advertisements). Similar to programming media source 108, advertising media source 110 may execute HTTP server software to respond to requests for advertising media. In response to such requests, advertising media source 110 provides the requested programming media to the application that requested the advertising media. A request for programming media may be initiated by the media client application or the template state server 112 as described below.

Generally, template state server 112 communicates with client system 102, template database 114, and scheduler 116 so that the temporal ratio between programming media and advertising media presented by the client system 102 approximates or equals a target temporal ratio. Typically, as users consume programming media from a web page or website in general, they are also sent advertising media, such as previews, branding, or advertisements. For these users, the programmer of the web page or website may desire to allocate the time between advertising media and programming media as a ratio, for example, 20 minutes of programming media to 1 minute of advertising media.

Template state server 112, template database 114, and scheduler 116 may cooperate to control such a ratio for a single website, multiple websites that are operated by a single entity or otherwise related, and/or multiple independently operated websites. As previously described, template state server 112 generally accesses or determines a target ratio from, for example, a template (which may be created with template editor 118) stored in template database 114. Template state server 112 may use the target ratio with information about the length of programming media that has been presented or that will be presented by client systems 102 to determine a length of advertising media that results in the ratio between programming media and advertising media for client system 102 to approximate or equal the target ratio or such that a ratio between a total length of advertising media and the total programming temporal length is substantially equal to the target ratio. The determined length is used, possibly along with other criteria, to determine specific piece(s) of advertising media to be presented by client system 102.

Template state server 112 may store various information related to the programming media and advertising media presented by client system 102 to a user. Template state server 112 may access such information in various ways such as, for example, receiving such information from client system 102. Template state server 112 may store such information on a per-user or per-client system basis.

Figure 4:
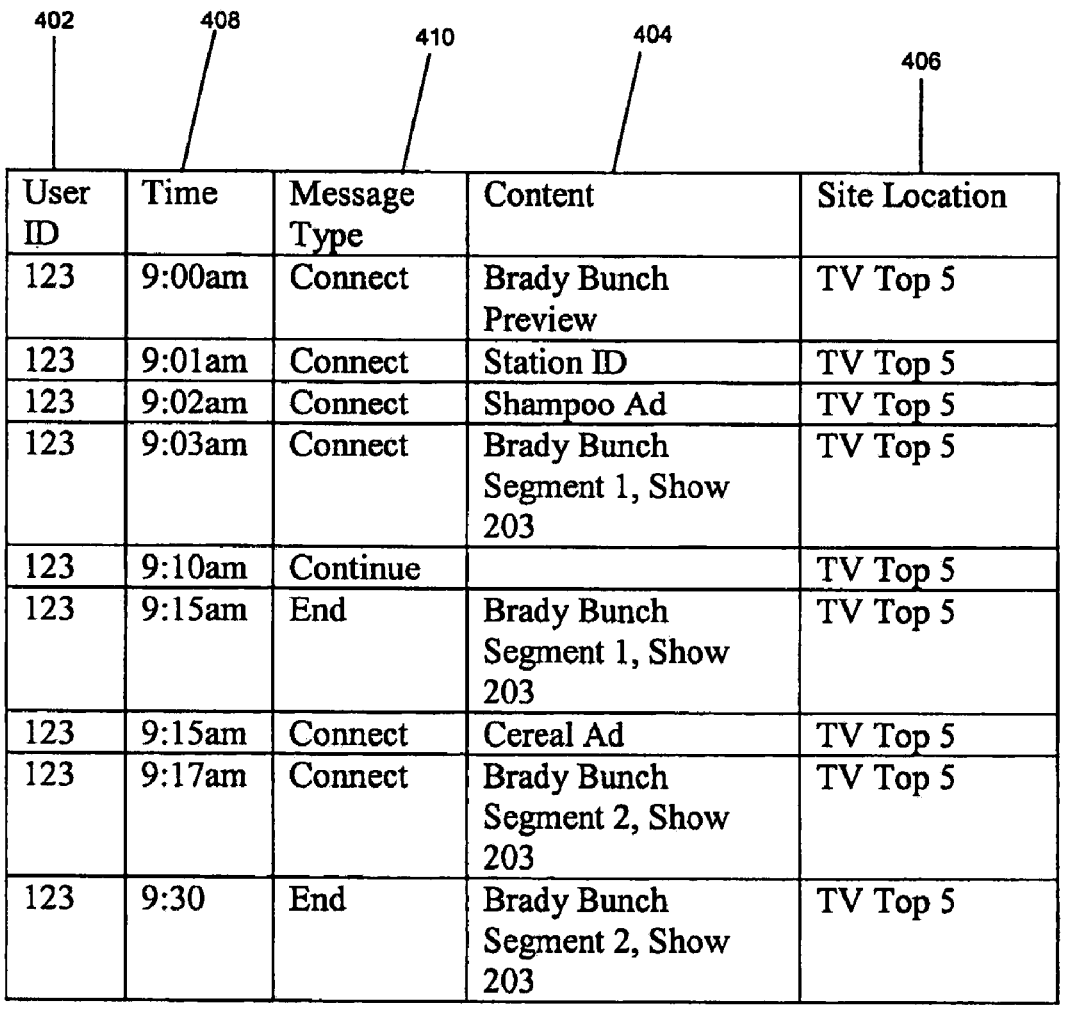
FIG. 4 shows an example of a table containing state information about the content consumed by a user.

Referring to FIG. 4, for instance, template state server 112 may generate a Globally Unique Identifier (GUID) 402 for each user. Based on information obtained from the media client application executing on client system 102, or otherwise obtained, template state server 112 associates state information about the content consumed by a user with a particular GUID. This state information may include, for example, an identifier that specifically identifies each segment or portion of programming or advertising media content presented to the user 404, the location in the website from which the segment or portion was obtained 406, and the time the presentation of the segment or portion started and the time the presentation was stopped 408 (or, alternatively, the amount of time the segment or portion was presented).

The information sent by client system 102 may be in the form of state updates. In such an implementation, the time 408 may be the time that the client system 102 sent the state update. The state updates may identify the state of the media client application (for example, whether it is connecting to media to present the media, continuing to present media, and stopping presentation of media). Some state may be inferred based on subsequent state updates. For instance, it may be inferred that the media client application has stopped presenting media when a subsequent state update indicates that the media client application has connected to different media for presentation. When the information is sent in the form of state updates, the type of status update 410 also may be stored and used by template state server 112, for example, to determine the temporal length of programming media content and/or advertising media content presented to the user.

Template database 114 stores templates, which outline the desired media experiences for advertising media presented to the user or the combination of advertising and programming media presented to the user. In general, the templates may specify target temporal ratio(s) for the website, a ratio for collections of web pages, a ratio for particular web pages, and/or ratios for other logical groupings of the content.

The target temporal ratio specified in a template may apply to a collection of web pages, may apply on a per web page basis, or if content is broken into channels, may apply on a per channel basis, or the ratio may be a global ratio that applies to all content consumed on the website. For instance, there may be a template designed for the "current events" section of a website, and the template specifies one target temporal ratio for a "world news" sub-topic of current events and another target temporal ratio for a "national news" sub-topic. Thus, as the user, for example, consumes content in the "world news" section, the ratio between advertising media and programming media is adjusted to approximate or equal the target temporal ratio for the "world news" section, while the ratio is adjusted to approximate or equal the target temporal ratio for the "national news" section as the user consumes content from that section of the website. Alternatively, if the target temporal ratio is a global ratio, then the ratio between programming media and advertising media consumed site-wide is adjusted to approximate or equal the target temporal ratio as the user consumes content from various sections of the website. Different ratios also may be set for different logical groupings of content.

Similarly, a template may be designed for the website, collections of web pages, a particular web page, channels, and/or other logical groupings of the content. For instance, a global template may be designed for a website. The global template indicates a desired media experience and one or more ratios between advertising media and programming media that apply regardless of the location from which the programming media is selected. Alternatively, different templates may be designed for general topics or themes within the website from which programming media can be selected (for example, a template for movies web page 212, a different template for action movies web page 212a, and a different template for current events web page 216, etc.). The template for a topic or theme indicates the media experience and may specify one target ratio that applies to all sub-topics or sub-themes or may specify different target ratios that apply to different sub-topics or sub-themes. The template for a topic or theme is then used for selections from the general topic/theme web page and selections from the sub-topic/sub-theme web pages under the general topic/theme web page. Also, web page specific templates may be designed (for example, a specific template may apply only to the alternative music web page 314a). There may be a combination of global and location specific templates. For example, the global template may act as a default template for locations in the website for which a template is not specifically designed.

In addition, there may be templates designed for different categories of programming media, regardless of the location in the website from which the content may be selected. For instance, there may be a template for sports programming media and a template for headline news programming media. Templates also may be designed for a combination of location and category of programming media. For example, there may be one template for sports programming media selected from a current events location of the website and a second template for sports programming media that is selected from a sports location of the website.

Templates also may be designed for other logical groupings. For example, templates may be designed based on which website or web page the content is being requested from and based on who owns the programming media content. An owner of programming media content may license such content to another entity so that the other entity can provide access to the content from its corresponding website or websites. However, as part of the contractual relationship between the owner and the other entity, the owner may retain certain rights regarding the media experience that a user has when watching the programming media content from the other entity's website(s). The owner may retain the rights to specify, for example, when advertising media is presented and/or the ratio of advertising media to programming media. Thus, the owner of the programming media content may be the one who designs the template specifying these items for its programming media content that is licensed to the other entity and made available on the other entity's website. Accordingly, the template designed by the owner could be used when the licensed programming media content is selected from the other entity's website.

Templates may be designed based on other factors as well. For example, templates may be designed based on whether the media client application accesses programming media content and/or advertising media content using a broadband or narrowband connection.

For each template, there may be a single ratio that applies regardless of the type of advertising media being presented, different ratios that apply to different types of advertising media (for example, a ratio that applies to branding and a different ratio that applies to advertisements), or one or more ratios that apply to one or more different types of advertising media (for example, a ratio that applies to branding and advertisements and a different ratio that applies to previews).

Templates also may define variations of the ratio(s) over time for a given logical grouping by being chained together such that the selection of a template depends on the template selected previously for a user. For example, a first template may define a ratio for movies web page 212 that applies regardless of the type of advertising media being presented, while a second template defines a different ratio. The first and second templates then may be chained together such that the first time a user selects programming media from movies web page 212 the first template is requested and the second time the user selects programming media from movies web page 212 the second template is requested. Alternatively, or additionally, a specific template may be used multiple times before the next template in the chain is selected. In this manner, the ratio or ratios (if there are different ratios for different types of advertising media) can be varied as a user selects programming media. The template state server 112 may track which templates were accessed previously by the user in order to effect the chaining of templates.

Figure 5A:
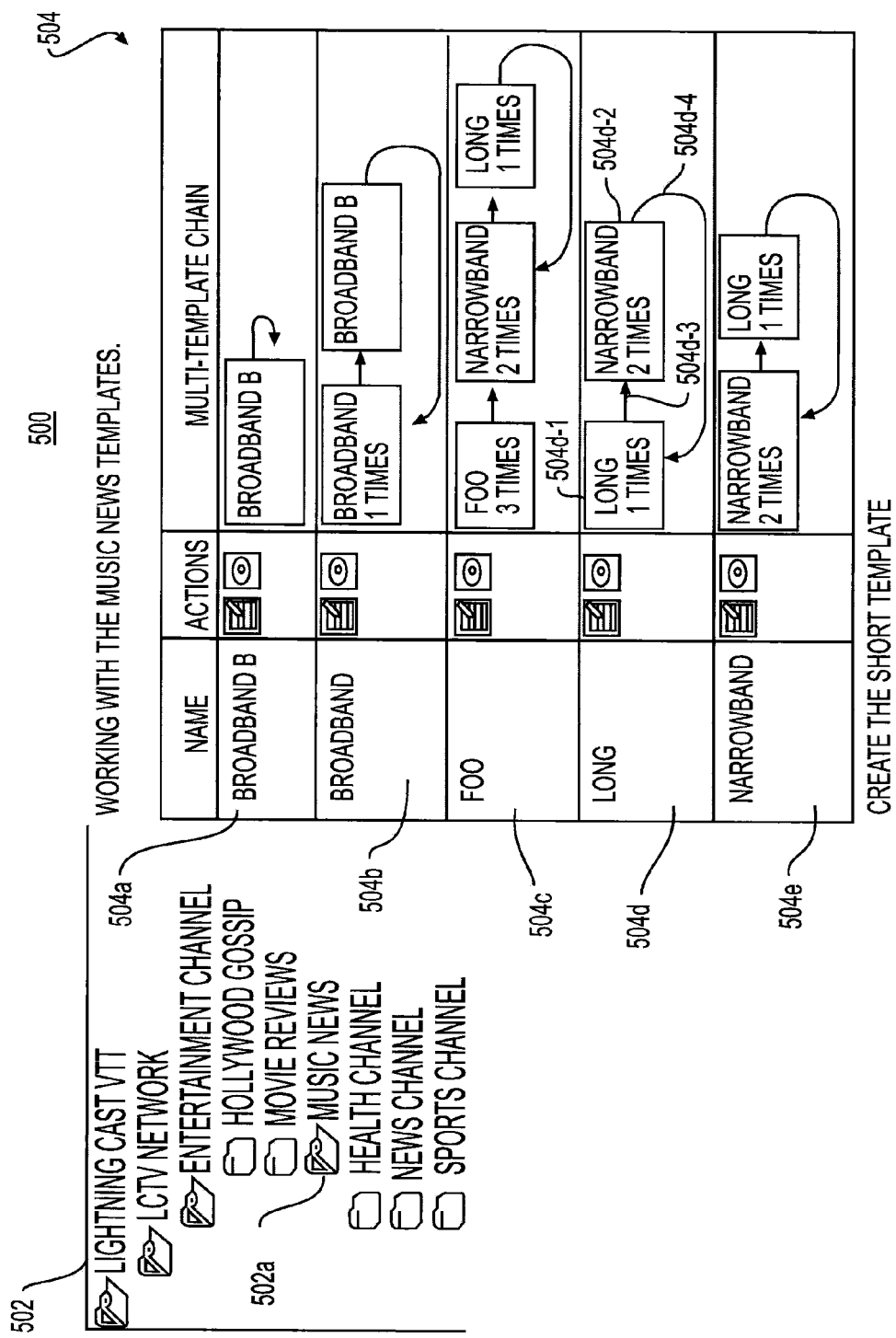
FIGS. 5A-5C show an example of interfaces for use with a template editor along with examples of templates.
Figure 5B:
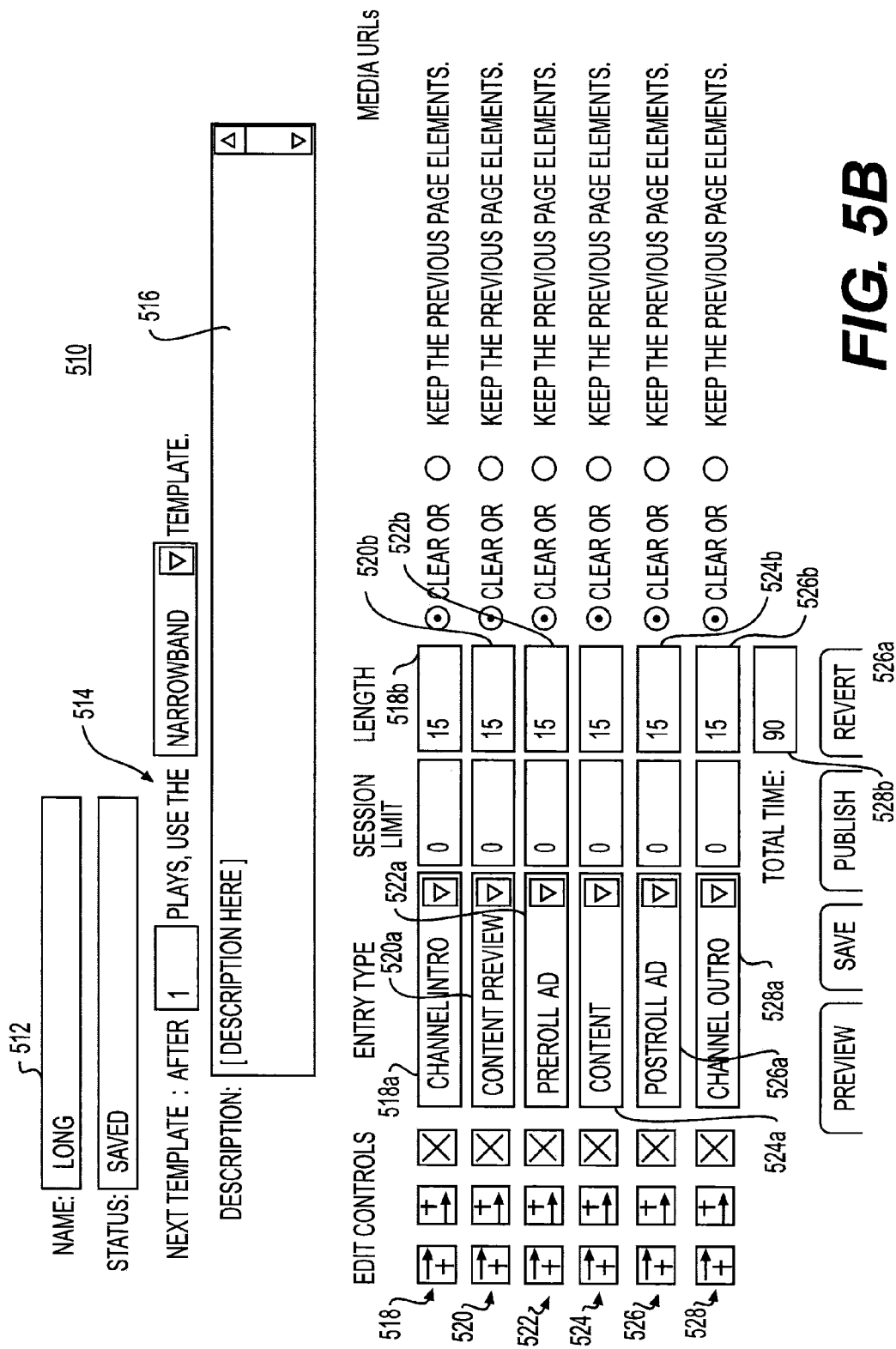
Figure 5C:
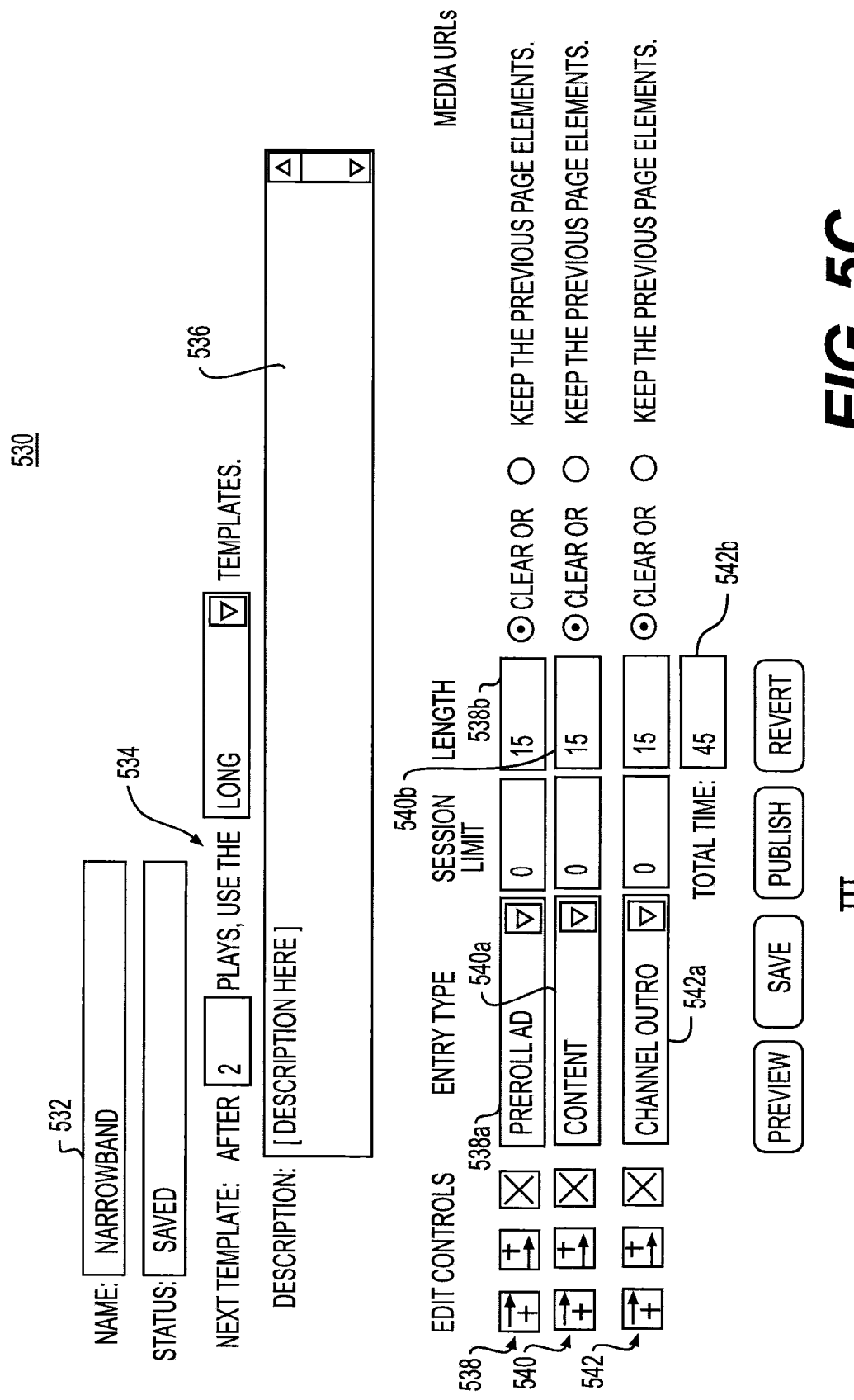

Template editor 118 allows a user to create and edit templates. FIGS. 5A-5C show an example of interfaces for use with template editor 118 along with examples of templates. Referring to FIG. 5A, an interface 500 displays the hierarchical website locations 502 in a manner that portrays the hierarchy of the website. When a user selects one of the locations 502 (for example, the Music News location 502a), a portion 504 of the interface shows various sets of chained templates that apply to content requested from the selected website location (for example, Music News 502a).

The examples shown in FIGS. 5A-5C correspond to an implementation in which sets of chained templates (where a set of chained templates may contain a single template) are designed for a given location in the website. The example shown has five sets of chained templates, a Broadband B set 504a, a broadband set 504b, a foo set 504c, a long set 504d, and a narrowband set 504e. The set chosen for a particular selection of programming media content from that location may then be based on any of the other factors above other than location. For instance, broadband set 504b may be selected for users who access media using a broadband connection, while narrowband set 504c may be selected for users who access media using a narrowband connection.

Portion 504 shows the templates contained in a set and how they are chained together. For example, long set 504d contains the long template and the narrowband template. This is shown by graphics 504d-1 and 504d-2. As shown, arrows, such as arrows 504d-3 and 504d-4, show the connections between the templates. Graphics 504d-1 and 504d-2 show how many times the corresponding template is used before the next template in the chain is used. Thus, for example, for long set 504d, the long template is used once, then the narrowband template is used twice, and then the long template is used once, and so on.

Referring to FIG. 5B, an interface 510 shows what media content is included in the long template. Interface 510 includes a section 512 that shows the name of the template. Interface 510 also includes a section 514 for defining the number of times the template is used and for specifying the next template in the chain. A section 516 allows a user to provide a description of the template.

Interface 510 has sections 518-528, each of which defines the type of content to be shown. Each section 518-528 has a section 518a-528a that allows the user to define the type of content and a section 518b-528b that defines the length of time of the content. The order of the sections defines the order of the content.

Accordingly, for the long template shown in FIG. 5B, the following types of content are shown in the following order: a channel intro (which is a type of branding), a preview, a pre-roll ad (that is, an advertisement that is shown before the programming media content), the programming media content selected, a post-roll ad (that is, an advertisement that is shown after the programming media content), and a channel outro (which also is a type of branding).

Because the length of the content is defined in the template, the ratio between programming media content and advertising media content is defined implicitly by the long template (in the example shown, it is a 1:5 ratio). The length of the content, however, need not be specified in the template.

Referring to FIG. 5C, an interface 530 for the narrowband template is shown. Similar to interface 510, interface 530 contains a section 532 that displays the name of the template, a section 534 for defining the number of times the template is used and specifying the next template in the chain, and a section 536 that allows a user to provide a description of the template.

Interface 530 also contains sections 538-542, which define the type of content to be shown for the narrowband template. Sections 538-542 also have a section 538a-542a that allows the user to define the type of content and a section 518b-528b that defines the length of time of the content. Thus, for the narrowband template shown in FIG. 5C, the following types of content are shown in the following order: a pre-roll ad, the programming media content selected, and a channel outro.

This results in a ratio of 1:2.

Thus, when a user selects programming media content from the webpage (or webpages) corresponding to the Music News topic 502a of the website and the long set 504d is used, the first time the user selects a segment of programming media content the long template is used to provide the appropriate advertising media content and programming media content. That is, when a user first selects a segment of programming media content, the user will be shown a channel intro, a preview, a pre-roll ad, the segment of programming media content selected, a post-roll ad, and a channel outro. The next two times the user selects a segment of programming media content, the user will be shown a pre-roll ad, the segment of selected programming media content, and a channel outro.

Referring again to FIG. 1, scheduler 116 selects particular pieces of advertising media to be presented by client system 102. To do so, scheduler 116 may store business rules regarding various advertising campaigns and execute software that evaluates those business rules to determine particular advertising media segments that are to be presented by client system 102. The business rules regarding an advertising campaign define the parameters under which associated advertising media should be presented, such as the timing that the advertising media should be presented (for example, at night or mid-afternoon), the percentage of the population to whom the advertising media should be presented, the frequency with which the advertising media should be presented, and/or the geographic location(s) of the users to whom the advertising media should be presented. Also, as described above, programming media content may be licensed from the owner of the content to another entity. In such a situation, the contractual relationship may specify certain rights regarding the programming media content that is reflected by the business rules. For example, the contractual relationship may specify the percentage of the other entity's advertising media that can be presented while the licensed programming media content is presented versus the percentage of advertising media that belongs to the owner. For example, the contractual relationship may specify that 20% of the advertising media content presented may belong to the entity licensing the programming media content, while the other 80% of advertising media content presented must belong to the owner of the programming media content.

Given general requirements for a piece of advertising media, such as the type of advertising media (for example, branding or advertisement) and the appropriate temporal length, scheduler 116 evaluates the various business rules, the types of different pieces of advertising media, and the temporal lengths of different pieces of advertising media to select a particular piece of advertising media that helps to satisfy both the various advertising campaigns and the general requirements.

Figure 6:
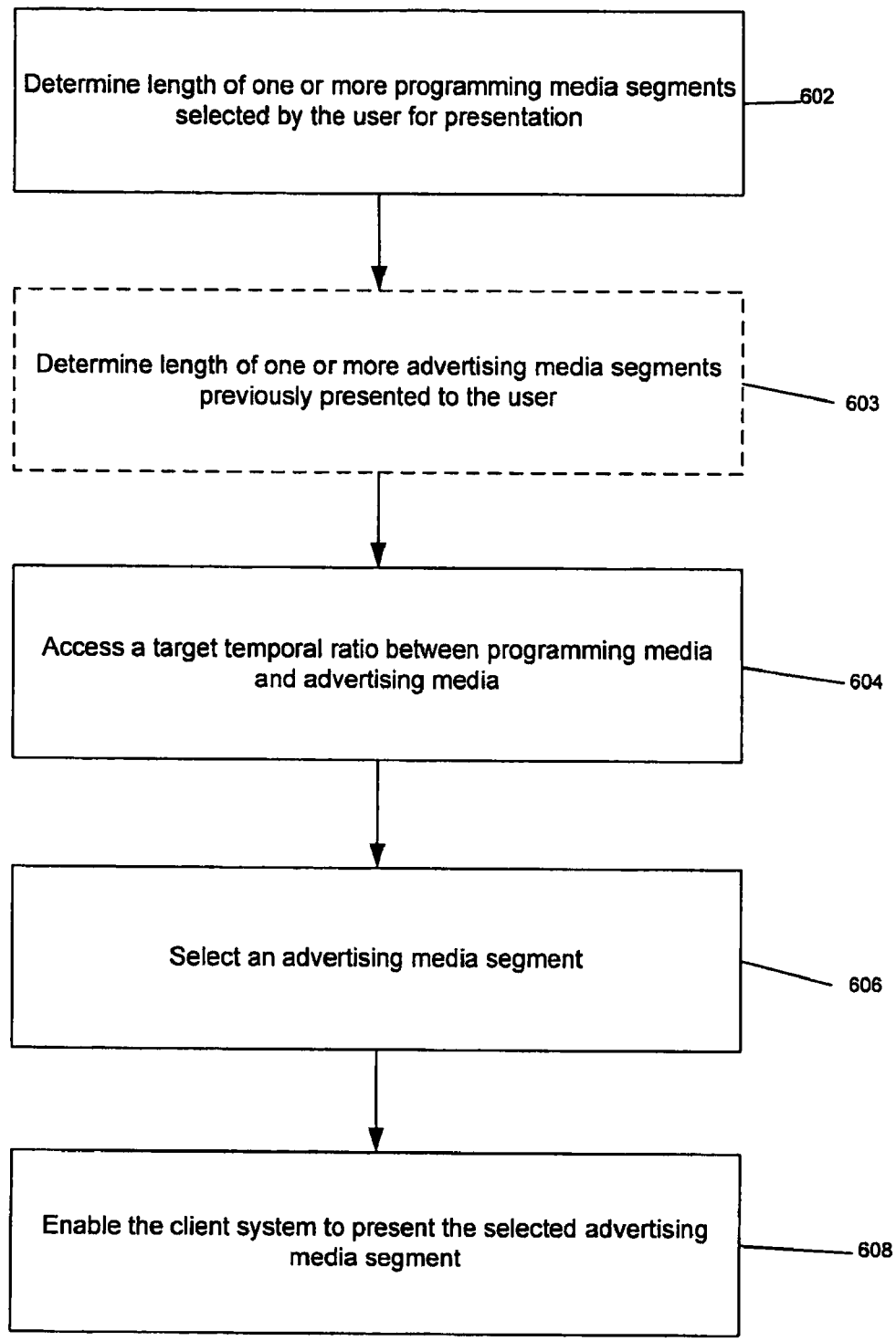
FIG. 6 shows a process that may be performed by components of the system of FIG. 1 to present programming media and advertising media on a client system with a ratio approximating or equaling a target temporal ratio.

Referring also to FIG. 6, in general, template state server 112, template database 114, and scheduler 116 implement process 600 so that the temporal ratio between programming media content and advertising media content presented by client system 102 approximates or equals a target temporal ratio. Process 600 includes template state server 112 determining the total temporal length of one or more programming media segments previously and/or presently selected by a user for presentation by client system 102 (602). Programming media segments may be any portion of programming media content presented by client system 102. For instance, a programming media segment may be a discrete piece of programming media content that is provided in an on-demand manner whenever the segment is selected in a web page. As another example, a programming media segment may be a portion of a continuous media stream presented to the user.

Template state server 112 determines the total temporal length based on, for example, information passed to template state server 112 by client system 102, state information tracked by template state server 112, and/or information regarding the programming media segment(s) stored in a database or other storage system. For instance, client system 102 may send information to template state server 112 regarding the temporal lengths of one or more programming media segments client system 102 has presented within a defined time frame in the recent past (for example, within the last hour), or client system 102 may send information regarding the total temporal length of one or more programming media segments that the client is going to present to the user in the future. Alternatively, for example, the client may send information to template state server 112 whenever client system 102 starts presenting and stops presenting programming media segments. In this manner, template state server 112 is able to track the total temporal length of one or more of the programming media segments already presented. As another alternative, client system 102 may send an identification of the programming media segment(s) and template state server 112 may use the identification to look up the temporal length of the programming media segment(s) in a database.

In some implementations, template state server 112 also may determine the total temporal length of one or more advertising media segments previously presented by client system 102 (603). In some implementations, the ratio between programming media content and advertising media content may be adjusted in an iterative fashion to approximate or equal the target temporal ratio. In other words, the length of the advertising media segment(s) needed to approximate or equal the target temporal ratio may be based on the previous ratio. For example, if programming media and advertising media has previously been presented in a ratio of 4:1 (4 minutes of programming media for every minute of advertising media) and the target ratio is 5:1, an advertising media segment may be selected that provides a ratio equal to or greater than 5:1 so that the ratio approximates 5:1 (assuming that an appropriate advertising media segment is not available at the time of selection to make the ratio equal to 5:1). Similarly, the length of the advertising media segment(s) needed may be based on the temporal length of the programming media segments that will be presented and the previous ratio. In such implementations, the total temporal length of one or more advertising media segments previously presented to the user may be determined and used with the total temporal length of one or more programming media segments to determine the temporal length of the advertising media segment(s) needed to approximate or equal the target temporal ratio.

Template state server 112 also accesses a target temporal ratio between programming media and advertising media (604). Template state server 112 may determine the target temporal ratio by accessing the target temporal ratio from a template stored in template database 114. In other implementations, template state server 112 may determine the target temporal ratio, for example, by accessing a target temporal ratio sent to template state server 104 by client system 102. Template state server 112 alternatively may determine the target temporal ratio by calculating, looking up, or otherwise computing the target temporal ratio based on information provided by client system 102, contained in a template, or stored by template state server 112. For example, a template may indicate that the target temporal ratio depends on the time of day and how many programming media segments have been presented from different locations on the website (which may be stored by template state server 112). The template state server 112 would then evaluate the pertinent information to determine the appropriate target temporal ratio.

Scheduler 116 selects one or more particular advertising media segments based on the target temporal ratio accessed by the template state server 112, the total temporal length of the programming media segment(s) selected, and, in some implementations, the total temporal length of previously presented advertising and/or programming media segment(s) (606). To do so, for example, template state server 112 may determine a total temporal length of one or more advertising media segments based on the target temporal ratio, the total temporal length of the programming media segment(s) selected, and, in some implementations, the total temporal length of previously presented advertising and/or programming media segment(s). The determined total temporal length of advertising media segment(s) provides a ratio between programming media and advertising media presented by the client system 102 that approximates or equals the target temporal ratio. Template state server 112 then communicates the determined total temporal length of advertising media segment(s) to scheduler 116. Scheduler 116 then may select one or more particular advertising media segments based on the determined total temporal length of advertising media segment(s).

The particular advertising media segment(s) selected by scheduler 116 satisfies the business rules (described above) and has a total temporal length that matches the determined total temporal length. As with the programming media segment, advertising media segments may be any portion of advertising media content presented by client system 102. In general, however, advertising media segments are discrete pieces of advertising media content that have a predefined temporal length. For instance, the advertising media segment may be a 30-second video advertisement. As another example, an advertising media segment may be a branding element that is overlaid across programming media for 10 seconds.

In some implementations, the temporal lengths of programming media segments and advertising media segments may be set to uniform sizes designed to provide the target temporal ratios. In such implementations, the ratio between the programming media and advertising media presented by a client system can normally be made to equal the target temporal ratio.

For example, if advertising media segments are designed to have temporal lengths that are integer multiples of a base temporal length (for example, 30 seconds) and programming media segments also are designed to have temporal lengths that are integer multiples of the base temporal length, then the ratio between advertising media and programming media may be able to equal the target ratio. In such a case, for instance, if the target ratio is 20 minutes of programming media for every 1 minute of advertising media, then when one or more programming media segments with a total temporal time of 1 hour (60 minutes, which is a multiple of 30 seconds) are presented, there also may be presented three one-minute advertising segments, or some other combination of 30-second, one-minute, two-minute, or three-minute advertising segments that have a total temporal length of three minutes.

If the hour of programming media is made up of a single programming media segment, then the advertising media segments may be presented before the programming media segment is presented, after the programming media segment is presented, or a combination of both. On the other hand, if the hour of programming media is made up of more than one programming media segment, then the advertising media segments may be interspersed before, after, or throughout the hour of programming media by being presented before or after one or more of the multiple programming media segments, or may be presented before or after the hour of programming media.

The above example can also be used to illustrate several different implementations of operation 602. If the ratio is designed to be satisfied every hour, then template state server 112 may determine the temporal length of programming media that has been displayed in the current hour. If the ratio is designed to be satisfied after every presentation of programming media, then template state server 112 may determine the temporal length of programming media since the last advertising media was presented.

In other implementations, programming media segments and/or advertising media segments may be different, non-uniform sizes. In this case, advertising media segments may be selected such that the current or future ratio is moved towards the target ratio so that over time the ratio averages out to the target ratio, or, if an advertising media segment of appropriate length is available, so that the ratio is equal to the target ratio. For example, if programming media and advertising media have previously been presented in a ratio of 4:1 (4 minutes of programming media for every minute of advertising media) and the target ratio is 5:1, an advertising media segment may be selected that provides a ratio equal to or greater than 5:1 so that the ratio approximates 5:1 (assuming that an appropriate advertising media segment is not available at the time of selection to make the ratio equal to 5:1).

Once the advertising media segment(s) have been selected, template state server 112 enables the client system 102 to present the selected advertising media segment(s) (608). For instance, template state server 112 may enable the client system 102 to play the one or more selected advertisement segments by providing the media client application with the location of the one or more selected advertisement media segments at the advertising media source 110, or other information that allows the media client application to access the advertising media segment(s) at advertising media source 110.

Alternatively, if template state server 112 has access to the selected advertising media segment(s), template state server 112 may retrieve the segment(s) and send them directly to the media client application for presentation. Template state server 112 may have access to the selected advertising media segment because template state server 112 may be able to communicate across a network with a server or other computing device on which advertising media source 110 is hosted. Alternatively, template state server 112 may have access to the advertising media segment(s) because advertising media source 110 is hosted on the same computing device as template state server 112.

In some implementations, advertising media segments may be transferred to and stored on client system 102 prior to selection. In such an implementation, template state server 112 may enable client system 102 to present the selected advertising media segment(s) by passing information to client system 102 that informs client system 102 of which advertising media segments stored on client system 102 to present.

Figure 7:
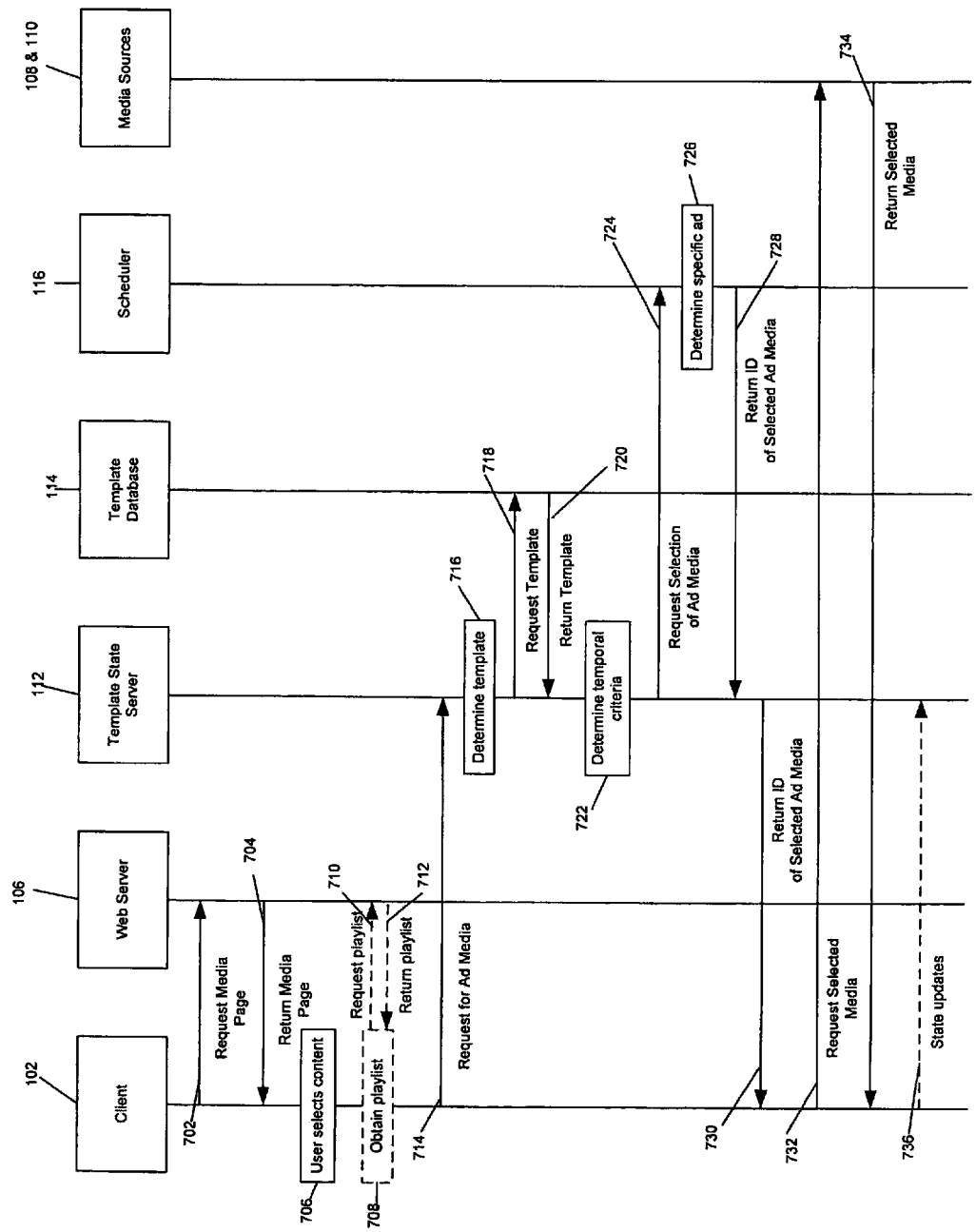
FIG. 7 illustrates communications of various components of the system shown in FIG. 1 for one implementation.

More specifically, and with reference to FIG. 7, in one implementation client system 102 sends a request for a media selection page to web server 106 (702). The media page is, for example, a web page in a hierarchically designed website as described above and includes selections of programming media which a user of client system 102 can select for presentation. Web server 106 returns the media page to client system 102 (704), which presents the media page to the user using, for example, a stand alone media client application or a web browser.

When a user selects one of the selections of programming media (706), a media client application executing on client system 102 is provided with a playlist of media content. For example, the user selection may cause the media client application to request the playlist from web server 106 or other server (708-712). Alternatively, the selection may invoke a client side script or program embedded in the webpage. The script or program then may invoke the media client application and provide the playlist to the media client application (708).

The playlist provides the media client application with information on the order in which advertising and programming media should be presented and information on how to retrieve or request the media. For instance, the playlist may include a list of URLs, where some of the URLs correspond to advertising media and others to programming media, and where the URLs are provided to the media client in the order in which the programming and advertising media is to be presented. The URLs corresponding to the programming media direct the media client application to request the programming media from programming media source 108, and the URLs corresponding to advertising media direct the media client application to request advertising media from template state server 112. The URLs corresponding to the advertising media may include URLs for different types of advertising media content, such as, for example, previews, branding, or advertisements, depending on the particular media experience desired.

As an example, a playlist may include URLs that result in the media client requesting and presenting the following media in the following order: (1) a branding media segment; (2) a preview media segment; (3) a programming media segment corresponding to the selection made by the user; and (4) and an advertisement media segment. The URL for the programming media results in the media client application sending a request to programming media source 108 for the programming media segment corresponding to the selection made by the user. The URLs for the different advertising media result in the media client application sending a request to template state server 112 for an advertising media segment of the type to which the URL corresponds. For example, the URLs for the advertising media may point to a resource, such as a common gateway interface (cgi) script or other executable program, on template state server 112. Such URLs may include URL-encoded parameters to be passed to the resource, where the parameters indicate information such as the type of advertising media or other information as described below.

Accordingly, for example, when the media client application begins processing the exemplary playlist, the media client application first sends a request for a branding media segment to template state server 112 (714). The request indicates that a branding media segment is needed for presentation. The request also may, for example, indicate the location in the hierarchical website from which the programming media was selected (for example, the web page from which the programming media was selected), the particular programming media selected, and/or a category of the programming media selected.

When template state server 112 receives the request from the media client application, template state server 112 determines the appropriate template (716). For instance, as described above, templates may apply depending on the location in the website from which the programming media was selected, the particular programming media selected, the owner of the particular programming media selected, and/or the category of the particular programming media. The particular template also may depend on which template was accessed previously for the user.

After determining the appropriate template, template state server 112 requests the appropriate template from template database 114 (718) and template database 114 returns the requested template (720). The returned template informs the template state server 112 of the target temporal ratio. Template state server 112 uses the indicated target temporal ratio, the total temporal length of one or more programming media segments that have been presented within a defined time frame in the recent past, and the total temporal length of one or more programming media segments that have been presented within a defined time frame in the recent past to determine the temporal length of the branding media segment that approaches or equals the target temporal ratio (722). Alternatively, template state server 112 may use the target temporal ratio and the temporal length of the programming media segment selected by the user, in addition to, or instead of, the total temporal length of the programming media segment(s) previously shown, to determine the temporal length of the branding media segment needed (722).

The total temporal length of one or more programming media segments that have been presented within a defined time frame in the recent past may be available to template state server 112 because the media client application tracks the amount of time programming media is presented and sends this with the request for branding. Alternatively, or additionally, template state server 112 may have such access by tracking when programming media is presented by client system 102 based on periodic or aperiodic state updates (636) sent by client system 102 to template state server 112. The state updates may indicate the start of a presentation of programming media, the end of such a presentation, and/or the programming media that is being presented. For instance, after client system 102 retrieves a programming media segment for presentation, client system 102 may send a status update to template state server 112 indicating that client system 102 is beginning the presentation of programming media. Then, during the presentation of the programming media, client system 102 may send one or more status updates indicating that the programming media is still being presented. Finally, when the presentation of the programming media segment is completed, client system 102 may send a status update that indicates the end of the presentation.

After determining the temporal criteria for the branding segment (722), template state server 112 then sends to scheduler 116 a request for the selection of an advertising media segment (724). The request includes an indication that a branding media segment is needed and an indication of the needed temporal length of the branding media segment.

Upon receiving the request for a selection, scheduler 116 selects an appropriate branding media segment that satisfies both the business rules and the needed temporal length (726). Scheduler 116 then returns the location, for example a URL, for the branding media segment in advertising media source 110 (728).

The URL is returned by template state server 112 to client system 102 (730). The media client application executing on client system 102 then uses the URL to request the branding media segment from the advertising media source 110 (732), which returns the branding media segment to client system 102 for presentation (734).

After the client system 102 presents the branding media element, the media client application processes the playlist URL for the preview media segment. As a result, the above-described process (714-734) is repeated for the preview media segment.

Once the preview media segment is presented by client system 102, the playlist URL for the programming media segment is processed. This results in the media client application requesting the programming media segment from the programming media source 108 (732) and the programming media source 108 returning the programming media segment to the client system 102 for presentation. Operations 714-730 are not performed in conjunction with processing the playlist URL for the programming media segments.

Lastly, after the programming media segment has been presented, the media client application processes the playlist URL for the advertisement media segment. Similar to the playlist URLs for other advertising media segments, this results in the above described process for the branding media segment (14-734) being performed for the advertisement media segment.

Figure 8:
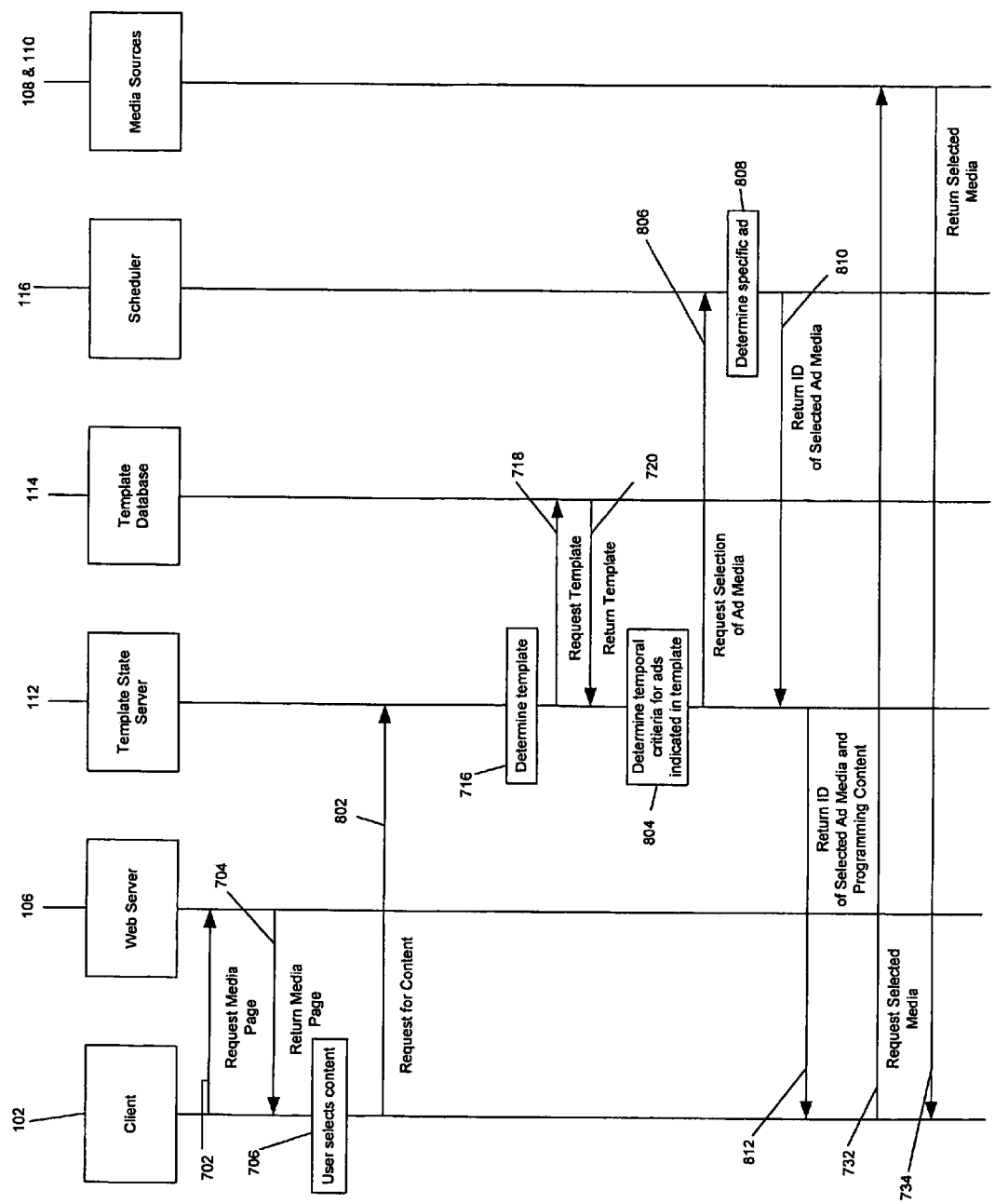
FIG. 8 illustrates communications of various components of the system shown in FIG. 1 for a second implementation.

Referring to FIG. 8, in another implementation, the template state server 112 provides the client application with the playlist, either all at once, or one URL at a time. Client system 102 sends a request for a media selection page (702) to web server 106. However, when a user selects one of the selections of programming media (706), the media client application sends a request for media to template state server 112 (802), rather than obtaining a playlist from the server 106 or a client-side script or program.

When template state server 112 receives the request from the media client application, template state server 112 determines the appropriate template (716). After determining the appropriate template, template state server 112 requests the appropriate template from template database 114 (718) and template database 114 returns the requested template (720). The requested template indicates the types of media to be presented, the order of the types of media, and the target temporal ratio(s) between programming media and advertising media.

As an example, the template may indicate the following order: (1) a branding media segment; (2) the selected programming media segment; and (3) an advertisement media segment. The template may indicate the target temporal ratio(s) explicitly. For instance, the template may indicate that the target temporal ratio for the branding media segment is 1:60 and that the target temporal ratio for the advertisement media segment is 1:20. An explicit ratio may be used when the template does not correspond to programming media segments of a set temporal length. For example, the template may be designed for the movies web page 212 and the movies web page 212 contains selections for programming media of various temporal lengths that are not known a priori. In this situation, template state server 112 may access a database to determine the temporal length of the programming media segment selected based on an indication of the selected programming media contained in the request (802) from the client system.

Once the template state server 112 determines the temporal length of the selected programming media, the template state server 112 uses the target temporal ratio(s) to determine the needed length of the advertising media segments. For the foregoing exemplary template, if the programming media segment has a temporal length of thirty minutes, the template state server 112 would determine that the branding media segment needs to be thirty seconds, while the advertising media segment needs to be one and a half minutes.

Alternatively, the template may indicate the target temporal ratio(s) implicitly by indicating the temporal length of the advertising segments (that is, the branding media segment and the advertisement media segment). This may be done when the template does correspond to programming media segments of set length. For example, the template may be designed for the music web page 214 and programming media segments available on the music web page 214 all have a set length, for example four minutes. In this case, the template may indicate that the branding media segment needs to be five seconds and the advertising media segment needs to be one minute to establish a target temporal ratio of 1:48 for branding and 1:4 for advertisements.

Thus, template state server 112 either explicitly or implicitly determines the temporal criteria for the advertising media segments indicated in the template (804), which for the exemplary template above is the branding media segment and the advertisement media segment. After determining the temporal criteria for the advertising media segments (804), template state server 112 then sends to scheduler 116 a request for the advertising media segments (806). The request includes an indication of the types of advertising media segments needed and the corresponding temporal lengths needed. For instance, for the exemplary template described above, the request includes (1) an indication that a branding media segment is needed and an indication of the needed temporal length of the branding media segment; and (2) and indication that an advertisement media segment is needed and an indication of the needed temporal length for the advertisement media segment.

Upon receiving the request for a selection, scheduler 116 selects an appropriate branding media segment and an appropriate advertisement media segment that satisfies both the business rules and the needed temporal lengths (808). Scheduler 116 then returns to the template state server 112 the locations, for example URLs, or other identification of the selected advertising media segments in advertising media source 110 (810). For the exemplary template, scheduler 116 returns the URLs for the selected branding media segment and the selected advertising media segment.

Template state server 112 also obtains the location (for example URL) of the programming media segment selected by the user. Template state server 112 obtains the URL, for example, by querying a database based on an indication of the selected programming media contained in the request (802) from the client system 102. Template state server 112 arranges the URLs into a playlist that contains the URLs for the branding media segment, the programming media segment, and the advertisement media segment in the order indicated by the template.

Template state server 112 then returns the playlist to the media client application (812). Based on the playlist, the media client application then requests (732) the media segments from the appropriate locations in media sources 108 and 110. The media sources 108 and 110 return (734) the media segments requested, which are presented by the client system.

Thus, for the playlist based on the exemplary template, the media client application executing on client system 102 uses the URL for the branding media segment to request the branding media segment from the advertising media source 110 (732), which returns the branding media segment to client system 102 for presentation (734).

After the client system 102 presents the branding media segment, the media client application processes the URL for the selected programming media segment. As a result, the media client application requests (732) the selected programming media segment from programming media source 110, which returns (734) the selected programming media segment to the media client application for presentation. Once the programming media segment is presented by client system 102, the URL for the advertising media segment is processed. This results in the media client application requesting (732) the advertising media segment from the advertising media source 110 and the advertising media source 110 returning the advertising media segment to the client system 102 for presentation (734).

In a modification of the implementation described with respect to FIG. 8, template state server 112 may send the URLs for each of the media segments one at a time, with the media client application constructed to send a state change or request the next media segment when the media client application has completed presenting the previous media segment. That is, template state server 112 may send the URL for the first media segment, which the media client application retrieves and presents. After the media segment is presented, the media client application requests the next media segment from template state server 112 or sends an indication that the presentation has stopped (or is about to stop) and awaits instructions from the template state server 112. Template state server 112 then sends the URL for the next media segment, along with instructions to present the media segment if needed (that is, if the media client application is waiting for specific instructions). After the last media segment is presented, template state server 112 informs the media client application that no more media segments need to be presented.

In such an implementation, template state server 112 may request selection of all the advertising media segments from scheduler 116 at one time, and then send the appropriate URL after receiving a request or other communication from the media client application. Alternatively, template state server 112 may request selection of the advertising media segments one by one as template state server 112 receives a request or other communication from the media client application.

The techniques described above are not limited to any particular hardware or software configuration. Rather, they may be implemented using hardware, software, or a combination of both. The methods and processes described may be implemented as computer programs that are executed on programmable computers comprising at least one processor and at least one data storage system. The programs may be implemented in a high-level programming language and may also be implemented in assembly or other lower level languages, if desired.

Any such program will typically be stored on a computer-usable storage medium or device (for example, CD-Rom, RAM, or magnetic disk). When read into the processor of the computer and executed, the instructions of the program cause the programmable computer to carry out the various operations described above.

A number of implementations have been described. Nevertheless, it will be understood that various modifications may be made. For example, while the foregoing has described the use the HTTP protocol and HTML, other standard or proprietary protocols may alternatively be used.

In addition, while the foregoing has described a user selecting programming media for presentation by explicitly selecting specific programming media from a web page, other implementations may include the user implicitly selecting the specific programming media through a web page or other interface. For example, the specific programming media presented to a user may be selected based on user preferences. The user preferences may be stored and, when the user selects a channel or other logical grouping of programming media, the specific programming media presented to the user is determined (for example, by the channel or by a client application executing on the user's system) based on the user preferences. In a one implementation, the user may select a channel, for example, by selecting a hyperlink for a channel from a webpage. In another implementation, such as a video-on-demand implementation where programming media is displayed on a television and transmitted, e.g., by a cable television network, the user may select a channel on the television. In such implementations, the user implicitly selects the specific programming media by selecting the channel, and the total temporal length of the programming media presented may depend on the amount of time the user continues to have programming media on the channel presented.

Also, some or all of the functionality of template state server 112, scheduler 116, and/or template database 114 may be implemented in client system 102. For example, in one implementation, client system 102 may download programming media and advertising media prior to presentation and be portable such that, when the programming media is presented, client system 102 is unable to communicate through network 104. In such an implementation, some or all of the functionality of template state server 112, scheduler 116, and/or template database 114 may be implemented in client system 102 so as to help maintain a desired target ratio between the programming media presented and the advertising media presented.

Furthermore, elements of one or more implementations may be combined, deleted, added, or modified to form further implementations. Accordingly, other implementations are within the scope of the following claims.

What is claimed is:

1. A computer-implemented method comprising:
   receiving an indication of one or more segments of electronic content;
   determining, by at least one processor, a length of the one or more segments of electronic content;
   identifying, by the at least one processor, a template defining a target ratio between a length of the one or more segments of electronic content and an advertising content length;
   determining, by the at least one processor, an advertising content length for the one or more segments of electronic content based on the determined length of the one or more segments of electronic content and on the target ratio of the identified template; and
   selecting one or more advertising content segments for delivery to a client system based on the determined advertising content length.

2. The method of claim 1, wherein the template is identified based on a selected channel.

3. The method of claim 1, wherein the template is identified based on a selected programming category.

4. The method of claim 1, wherein the template is identified based on an owner of the content.

5. The method of claim 1, wherein the template is identified based on a connection speed of the client system.

6. The method of claim 1, wherein the template is identified based on a time of day.

7. The method of claim 1, wherein the template is identified based on a location of a user selection of the one or more segments of electronic content.

8. The method of claim 1, wherein the template defines different ratios for different types of advertising media.

9. The method of claim 1, wherein the template is identified based on a different template that was previously identified.

10. The method of claim 1, wherein the target ratio defined by the template varies over time.

11. The method of claim 1, further comprising:
selecting one or more advertising content segments for delivery to the client system based on the determined advertising content length and at least one of a time at which the advertising media should be presented, a percentage of a population to whom the advertising media should be presented, a frequency with which the advertising media should be presented, a geographic location of users to whom the advertising media should be presented, and a contractual relationship defining advertising media to be presented.

12. A system, comprising:
a storage device that stores a set of instructions; and
at least one processor that executes the set of instructions to:
receive an indication of one or more segments of electronic content;
determine a length of the one or more segments of electronic content;
identify a template defining a target ratio between a length of the one or more segments of electronic content and an advertising content length;
determine an advertising content length for the one or more segments of electronic content based on the determined length of the one or more segments of electronic content and on the target ratio of the identified template; and
select one or more advertising content segments for delivery to a client system based on the determined advertising content length.

13. The system of claim 12, wherein the template is identified based on a selected channel.

14. The system of claim 12, wherein the template is identified based on a selected programming category.

15. The system of claim 12, wherein the template is identified based on one of an owner of the content, a connection speed of the client system, a time of day, and a location of a user selection of the one or more segments of electronic content.

16. The system of claim 12, wherein the template defines different ratios for different types of advertising media.

17. The system of claim 12, wherein the template is identified based on a different template that was previously identified.

18. The system of claim 12, wherein the target ratio defined by the template varies over time.

19. The system of claim 12, wherein the set of instructions further cause the at least one processor to:
select one or more advertising content segments for delivery to the client system based on the determined advertising content length and at least one of a time at which the advertising media should be presented, a percentage of a population to whom the advertising media should be presented, a frequency with which the advertising media should be presented, a geographic location of users to whom the advertising media should be presented, and a contractual relationship defining advertising media to be presented.

20. A non-transitory computer-readable storage medium storing instructions
that, when executed by a computer, cause the computer to perform a method, the method comprising:
receiving an indication of one or more segments of electronic content; determining a length of the one or more segments of electronic content; identifying a template defining a target ratio between a length of the one or more
segments of electronic content and an advertising content length;
determining an advertising content length for the one or more segments of electronic content based on the determined length of the one or more segments of electronic content and on the target ratio of the identified template; and
selecting one or more advertising content segments for delivery to a client system based on the determined advertising content length.

* * * * *